April 25, 1944.  R. HEFLER ET AL  2,347,411
METHOD OF LOCATING HOLES IN STRUCTURAL MEMBERS
Filed Dec. 12, 1942
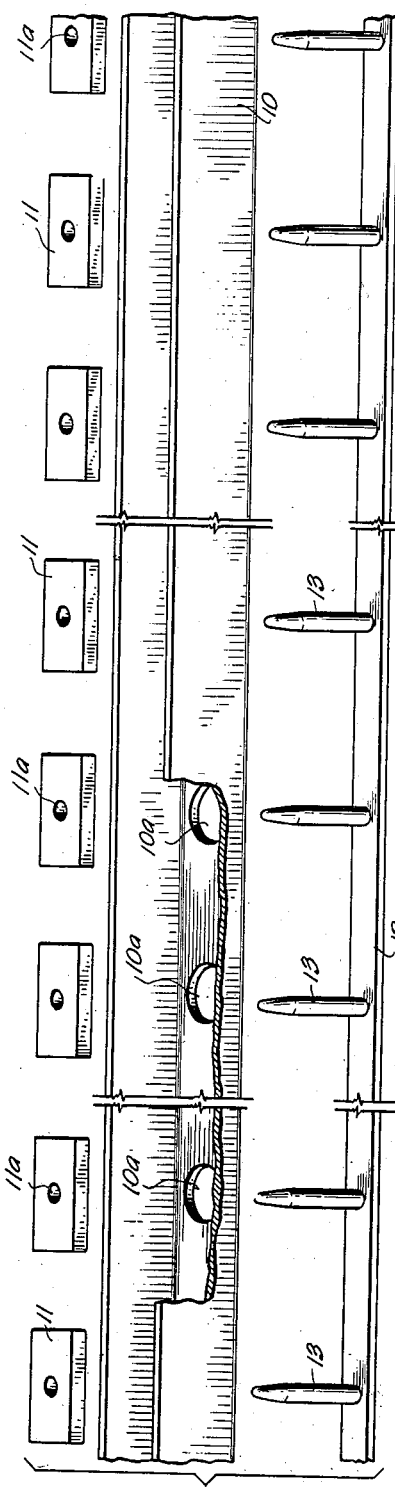
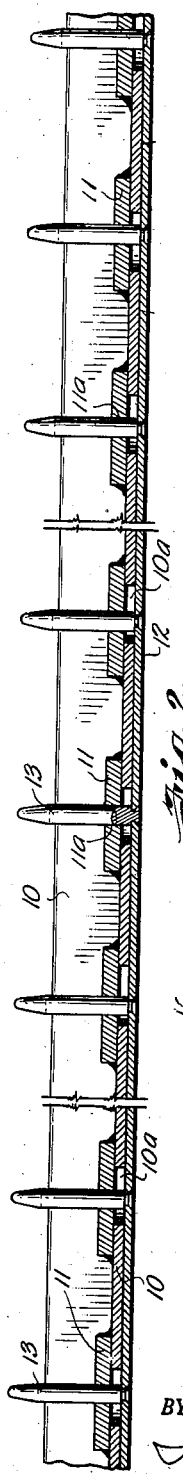
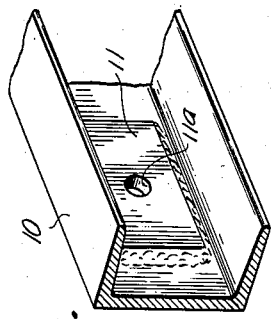
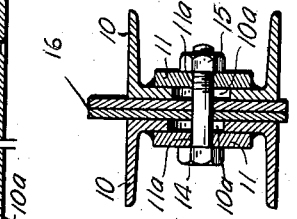
INVENTORS.
Rudolf Hefler
Harold C. Myers
BY
ATTORNEY.

Patented Apr. 25, 1944

2,347,411

UNITED STATES PATENT OFFICE 2,347,411

METHOD OF LOCATING HOLES IN STRUCTURAL MEMBERS

Rudolf Hefler and Harold C. Myers, Kansas City, Mo., assignors to Butler Manufacturing Company, Kansas City, Mo., a corporation of Missouri Application December 12, 1942, Serial No. 468,826

3 Claims. (Cl. 29—155)

Our invention relates to a method of and apparatus for accurately locating holes in a structural member according to a predetermined pattern.

When making a prefabricated structure, it is often necessary to drill a plurality of holes in an exceedingly long structural member. Many types of construction require that a great many identical pieces be provided and that the holes in each piece be accurately dimensioned and precisely located.

Under ordinary conditions, the holes can be drilled by fixed center gang dies. However, if the structural members are exceedingly long, this method is impractical. Heretofore, pieces too long for a gang die have been drilled by hand. When this is done, the pieces must be carefully measured and the hole locations marked. Each hole is then drilled separately. This is a lengthy, tedious and expensive task.

We have developed a method of accurately, quickly and inexpensively locating holes in structural members that is particularly adapted to be applied to pieces too long for a gang die, although it may obviously be used for any size member.

In general, the invention comprises drilling or punching oversize holes in a member in approximate accordance with a predetermined pattern. Since these holes need not be precisely located they can be quickly made. Small bearing plates having accurately dimensioned holes are easily and quickly located to cover the oversize holes by means of a suitable assembly jig. The jig positions the holes in the bearing plates in exact accordance with a predetermined pattern. The bearing plates are then secured to the members as by tack welding.

The assembly jig here illustrated comprises a bar having a plurality of upstanding pins located to accurately conform to the hole pattern of the structural member. After the pins have been inserted in the oversize holes, the bearing plates are fitted on the pins and welded to the structural member. The assembly jig can then be removed. The hole pattern established by use of a jig of this type may or may not have the hole in longitudinal alignment. Likewise, if the structural member is an angle iron or channel, for example, part of the holes can be on one gauge and part on another.

Where light weight is desirable, the structural members are made from thin metal which is subject to distortion and rupture occasioned by stresses imposed in the tightening of bolts and nuts. Welding on bearing plates in the establishment of the hole pattern serves as a substantial metal reinforcement. Thus the bearing plates provide a more rigid construction while adding but little additional weight.

Another feature of the invention is to provide a method of joining structural members wherein the connecting bolts snugly fit holes in bearing plates welded to both connected members in place of having the bolt holes in one member closely fitting and the bolt holes in the adjoining member loosely fitting with oversized clearance for errors of registration as is the usual practice. By prior art methods, registration of holes in adjacent pieces is rarely accomplished. Sagging of the finished structure sometimes results from oversize holes which permit relative movement between the pieces. If holes in both connecting members snugly fit the bolt, a rigid structure is assured.

The diameter of the pins on the jig snugly fit the holes in the bearing plates which they locate. Consequently, if the holes in the plates are to be of different sizes, it will be necessary to have correspondingly different sized pins on the jig.

From the foregoing, it will be apparent that an important object of our invention is to provide a method of rapidly and inexpensively prefabricating structural members and particularly members that are too long for use with a gang die.

Another object of our invention is to provide a method of prefabricating structural members that permits a lighter gauge metal to be used than would otherwise be possible.

Still another object of our invention is to provide a method of the above mentioned character that provides a more rigid finished structure by accurately positioning the holes in each member and providing a plurality of members having identically positioned holes.

Other objects and advantages of our invention will be apparent during the course of the following description.

In the drawing forming a part of this specification and wherein like numerals are employed to designate like parts throughout the same, Fig. 1 is an exploded perspective view illustrating a structural member, a plurality of bearing plates and an assembly jig for locating the bearing plate holes in accordance with a predetermined pattern, Fig. 2 is a longitudinal sectional view of the parts in Fig. 1, assembled, Fig. 3 is a transverse sectional view, showing accurate alignment of both holes by bearing plates attached to connected channels, and Fig. 4 is a fragmentary perspective view of a channel having a bearing plate welded thereto.

In the accompanying drawing wherein, for the purpose of illustration, is shown a preferred embodiment of my invention, the numeral 10 designates a structural member having the form of a channel. A plurality of oversize holes 10a are drilled or punched in channel 10 generally in accordance with a predetermined pattern. In practice, the positions of the holes 10a are marked on the channel by measuring or by means of a template. The channel is then passed through a drill or punch machine which forms the holes. The positions of holes 10a must be approximately correct but it is satisfactory if they are slightly off center. Consequently, these holes can be formed rapidly without expending valuable time in careful measuring or in setting the drilling machine.

Bearing plates 11 adapted to cover the oversize holes 10a are located by an assembly jig and welded or otherwise secured to the channel. The jig comprises a bar 12 carrying a plurality of upstanding pins 13 exactly spaced and located in accordance with the predetermined hole pattern for the channel. A pin having the diameter of the bolt to be inserted is provided for each hole in the channel. To locate plates 11, the jig is clamped to the channel 10 with the pins 13 projecting through holes 10a, as best shown in Fig. 2. A bearing plate 11 is then fitted to each pin 13, the pins extending through holes 11a in the plates. Of course, pins 13 eccentrically fit at least some of the oversize holes 10a since these holes are not accurately located but the bearing plate holes 11a are precisely located in accordance with the predetermined pattern because they snugly fit and are centered by the pins 13.

By carefully spacing the end pins 13 from the border of the structural member, all of the pins are necessarily on the proper gauge and are properly spaced with respect to each other. If the pins are so spaced, holes 11a are obviously also so spaced.

After being positioned by the jig, bearing plates 11 are easily and expeditiously tack welded to channel 10. The channel is then lifted from the assembly jig. Obviously an assembly jig can be used over and over again on structural members having the same hole pattern.

If in the finished structure, two channels are to be secured together by bolts 14 and nuts 15, all holes in the channels will register exactly since they were located by the same or identical jig. Fig. 3 shows two channels, bolted together at opposite sides of strut 16. Such a construction is frequently encountered. It will be observed that, even though holes 10a are off center and do not register with each other, holes 11a are one exactly the same gauge and are in exact registration. Bolt 14 snugly fits both of the openings 11a as well as the opening in strut 16. There can be no sagging caused by shifting of either member 10 since neither has a conventional oversize clearance hole. The manner in which the plates 11 reinforce the structural members 10 is also clearly illustrated in Fig. 3. Even though members 10 are made from very light weight metal, the reinforcement afforded by plates 11 prevents either the head of bolt 14 or the nut 15 from pulling through the metal.

From the foregoing, it will be apparent that we have accomplished the objects of our invention. We have provided a method of rapidly and inexpensively prefabricating structural members that accurately locates the holes therein in accordance with a predetermined pattern. We have provided a method that permits lighter weight metal to be used than would otherwise be possible. By using the invention, a more rigid finished structure is produced.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described our invention, we claim:

1. A method of accurately locating holes in a structural member, comprising the steps of making oversize holes in the structural member at approximately the desired locations, inserting a jig having accurately positioned pins into said oversize holes, fitting a separate plate having an accurately dimensioned hole on each of the pins, and securing the plates while positioned by the pins to the structural member.

2. A method of accurately locating holes in a structural member, comprising the steps of making oversize holes in the structural member, said holes being approximately located according to a predetermined pattern, inserting a jig having pins accurately positioned according to said predetermined pattern into said oversize holes, fitting plates having accurately dimensioned holes on the pins, securing the plates while positioned by the pins to the structural member, and then withdrawing the pins from the holes in said plates.

3. A method of accurately locating holes in a structural member comprising the steps of making oversize holes in the structural member at approximately the desired locations, inserting a jig having accurately positioned pins into the oversize holes, fitting a separate plate having an accurately dimensioned hole on each of the pins, securing the plates while positioned by the pins to the structural member, and then withdrawing the pins from the holes in said plates.

RUDOLF HEFLER.
HAROLD C. MYERS.